US010815414B2

(12) United States Patent
Panga et al.

(10) Patent No.: US 10,815,414 B2
(45) Date of Patent: Oct. 27, 2020

(54) WATER CONTROL AGENT FOR OILFIELD APPLICATION

(71) Applicant: SCHLUMBERGER TECHNOLOGY CORPORATION, Sugar Land, TX (US)

(72) Inventors: Mohan Kanaka Raju Panga, Sugar Land, TX (US); Valerie Gisele Helene Lafitte, Sugar Land, TX (US); Richard Donald Hutchins, Sugar Land, TX (US); Philippe Enkababian, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 85 days.

(21) Appl. No.: 15/575,397

(22) PCT Filed: May 19, 2016

(86) PCT No.: PCT/US2016/033160
§ 371 (c)(1),
(2) Date: Nov. 20, 2017

(87) PCT Pub. No.: WO2016/187361
PCT Pub. Date: Nov. 24, 2016

(65) Prior Publication Data
US 2018/0163122 A1 Jun. 14, 2018

Related U.S. Application Data

(60) Provisional application No. 62/164,211, filed on May 20, 2015.

(51) Int. Cl.
E21B 33/138 (2006.01)
E21B 43/04 (2006.01)
E21B 43/20 (2006.01)
C09K 8/514 (2006.01)
C09K 8/58 (2006.01)
C09K 8/66 (2006.01)
C09K 8/504 (2006.01)
C09K 8/588 (2006.01)

(52) U.S. Cl.
CPC ............ *C09K 8/514* (2013.01); *C09K 8/5045* (2013.01); *C09K 8/58* (2013.01); *C09K 8/588* (2013.01); *C09K 8/665* (2013.01); *E21B 33/138* (2013.01); *E21B 43/20* (2013.01); *C09K 2208/10* (2013.01)

(58) Field of Classification Search
CPC .............. C09K 2208/10; C09K 2208/12; C09K 8/516; C09K 8/665; C09K 8/58; C09K 8/032; E21B 33/138; E21B 43/267; E21B 49/005; E21B 21/003; E21B 43/20
See application file for complete search history.

(56) References Cited

U.S. PATENT DOCUMENTS

| | | |
|---|---|---|
| 4,004,639 A | 1/1977 | Sandiford |
| 4,341,807 A | 7/1982 | Turbak et al. |
| 4,374,702 A | 2/1983 | Turbak et al. |
| 4,378,381 A | 3/1983 | Turbak et al. |
| 4,452,721 A | 6/1984 | Turbak et al. |
| 4,452,722 A | 6/1984 | Turbak et al. |
| 4,464,287 A | 8/1984 | Turbak et al. |
| 4,483,743 A | 11/1984 | Turbak et al. |
| 4,487,634 A | 12/1984 | Turbak et al. |
| 4,500,546 A | 2/1985 | Turbak et al. |
| 4,863,565 A | 9/1989 | Johnson et al. |
| 6,228,812 B1 | 5/2001 | Dawson et al. |
| 7,381,294 B2 | 6/2008 | Suzuki et al. |
| 8,053,397 B2 | 11/2011 | Huang et al. |
| 2004/0031611 A1 | 2/2004 | Huang et al. |
| 2005/0016726 A1 | 1/2005 | Nguyen et al. |
| 2009/0286702 A1 | 11/2009 | Huang et al. |
| 2011/0036522 A1 | 2/2011 | Ankerfors et al. |
| 2012/0015852 A1* | 1/2012 | Quintero .................. C09K 8/32 507/112 |
| 2012/0285691 A1 | 11/2012 | Berger et al. |
| 2013/0154926 A1 | 6/2013 | Kim et al. |
| 2013/0196883 A1 | 8/2013 | Rincon-Torres et al. |
| 2013/0274149 A1 | 10/2013 | Lafitte et al. |
| 2013/0317135 A1 | 11/2013 | Vega |
| 2013/0341010 A1 | 12/2013 | Nevison |

(Continued)

FOREIGN PATENT DOCUMENTS

| | | |
|---|---|---|
| WO | 2007091942 A1 | 8/2007 |
| WO | 2011051882 A1 | 5/2011 |

(Continued)

OTHER PUBLICATIONS

International Search Report and Written Opinion issued in International Patent Appl. No. PCT/US2016/033160 dated Aug. 8, 2016; 9 pages.

(Continued)

*Primary Examiner* — Zakiya W Bates
(74) *Attorney, Agent, or Firm* — Rodney Warfford

(57) ABSTRACT

Methods for treating subterranean wells involve treating fluids that contain water and a plurality of water dispersible nanoparticles. The nanoparticles may be nanocellulose, rod-like nanoparticles, nanotubes or halloysite or combinations thereof. The water dispersible nanoparticles form one or more aggregates that plug formation pores and may control fluid flow into the formation as well as fluid flow from the formation into a wellbore.

20 Claims, No Drawings

(56) References Cited

U.S. PATENT DOCUMENTS

| | | | |
|---|---|---|---|
| 2014/0096964 A1* | 4/2014 | Chakraborty | B82Y 30/00 |
| | | | 166/279 |
| 2014/0291025 A1 | 10/2014 | Chenevert et al. | |
| 2014/0374095 A1 | 12/2014 | Ladva et al. | |
| 2015/0072902 A1 | 3/2015 | Lafitte et al. | |
| 2015/0260021 A1* | 9/2015 | Reyes | C09K 8/528 |
| | | | 166/300 |
| 2017/0037302 A1* | 2/2017 | Liang | C09K 8/882 |

FOREIGN PATENT DOCUMENTS

| | | |
|---|---|---|
| WO | 2011089323 A1 | 7/2011 |
| WO | 2012072874 A1 | 6/2012 |
| WO | 2012152997 A1 | 11/2012 |
| WO | 2013085412 A1 | 6/2013 |
| WO | 2013154926 | 10/2013 |
| WO | 2014049208 A1 | 4/2014 |
| WO | 2014089214 | 6/2014 |

OTHER PUBLICATIONS

Office Action issued in Russian Patent Appl. No. 2017144539 dated Nov. 7, 2018; 18 pages.

\* cited by examiner

WATER CONTROL AGENT FOR OILFIELD APPLICATION

CROSS-REFERENCE TO RELATED APPLICATION(S)

This application claims the benefit of U.S. Provisional Application Ser. No. 62/164,211 filed May 20, 2015 entitled "Water Control Agent For Oilfield Application" to Panga et al., the disclosure of the provisional application is incorporated by reference herein in its entirety The statements in this section merely provide background information related to the present disclosure and may not constitute prior art.

BACKGROUND

This disclosure relates to compositions and methods for treating subterranean wells. The compositions and methods are directed toward controlling the movement of water in and out of permeable formations surrounding the wellbore.

Hydrocarbons (oil, natural gas, etc.) may be produced from a subterranean geologic formation (a "reservoir") by drilling a well that penetrates the hydrocarbon-bearing formation. Well treatment methods are often employed to increase hydrocarbon production that use a chemical composition or fluid, such as a treatment fluid.

Production of water and aqueous fluids from oil and gas wells is a common phenomenon that is a major obstacle to maximizing the hydrocarbon production potential of these wells. As hydrocarbons are removed from a producing well, water may begin to move through the formation toward the wellbore where it may be produced along with the hydrocarbons.

Water production may reduce the amount of oil and/or gas that may be ultimately recovered from a well. Water takes the place of the hydrocarbons that may flow or be lifted from a well, and increases the production cost owing to the equipment required to separate water from the produced hydrocarbons. Further costs may be incurred from disposing of large amounts of produced water, inhibiting the corrosion of tubulars, and replacing downhole tubulars and surface equipment.

Preventing unwanted water production helps maintain a productive field. There is a wide array of treatments available to solve this problem; however, many suffer from certain difficulties including, but not necessarily limited to, surface mixing and handling problems.

Previous methods that have been used to control or restrict water production include processes that take place within formation pores. For example, gellation of polyvinyl alcohol ("PVA") or polyacrylic acid ("PAA"), or the condensation polymerization of phenyl and formaldehyde within formation pore channels are designed to damage pore channels within the formation matrix and restrict fluid movement through the channels.

Another chemical water control technology uses sodium silicate solutions and crosslinked polymers. The silicate solution is typically not compatible with formation waters, because sodium silicate instantly reacts with calcium chloride to generate calcium silicate gel. In this approach, the two solutions may be injected in any order and must be separated by an inert aqueous spacer liquid. U.S. Pat. No. 4,004,639, incorporated by reference herein in its entirety, describes chemical systems that achieve water shut-off in producing wells.

Yet another technique involves installing a barrier in a subterranean area adjacent to the wellbore, such as concrete resin or particulate matter, effectively blocking fluid flow in the vicinity. The treated area is then perforated in strategic regions to restore hydrocarbon production while minimizing water production.

Crosslinked polymers have also been used to shut off or inhibit water flow. However, crosslinked polymer technology may involve a multi-stage placement process whereby the linear polymer fluid and the crosslinker are separated by an inert spacer. In such multi-component systems, the polymer and crosslinker may chromatographically separate from the polymer leaving an unsuitable gel. Crosslinked polymer technology may also employ a delayed crosslinking method that may depend on the well temperature and fluid transit time in the formation as design parameters.

It is also known in the art to inject water into a subsurface formation to displace hydrocarbons (oil and gas) from one part of the formation to another as a step in a method for enhancing the recovery of the desirable fluid from the formation. During this enhanced oil recovery (EOR) process, the injected water can at times preferentially flow into and through one part of the formation as compared to another part of the formation. The formation, or part thereof, into which the water ore readily flows may have a higher permeability or porosity, and is sometimes referred to as a channeling or thief zone. Consequently, the water flow through the formation is not uniform, and the desired displacement of oil and gas may not be achieved. Efforts to render the physical properties of a formation more uniform, thereby causing the injected water to flow uniformly into and through the entire formation have been referred to in the art as profile modification and/or conformance control. The treating fluids herein may be advantageously used to shut off or prevent the injected water from wastefully flowing into these thief zones. Thus, the methods and compositions herein may be used to improve water injection control to increase sweep efficiency during secondary and tertiary hydrocarbon recovery.

A further disadvantage of many conventional water control compounds is that they may be unstable in acids and heavy brines, incompatible with hydrogen sulfide or carbon dioxide, and/or may degrade at elevated temperatures. These characteristics may limit the usefulness of the compounds useless in many downhole applications. Furthermore, certain chemicals may react with minerals in the formation, thus diminishing their concentrations and effectiveness.

SUMMARY

Described herein are treatment fluids comprised of water and a plurality of water dispersible nanoparticles, wherein the water dispersible nanoparticle is capable of blocking fluid flow through higher permeability porous media and redirecting fluid flow to lower permeability areas within the subterranean formation.

In an aspect, embodiments relate to methods for treating a subterranean well having one or more permeable formations. A treatment fluid is prepared that comprises water and a plurality of water dispersible nanoparticles. The treatment fluid is then placed in the subterranean formation such that the water dispersible nanoparticles form one or more aggregates that plug formation pores and block further fluid flow in the formation.

In a further aspect, embodiments relate to methods for controlling water production from a subterranean well having a wellbore and one or more permeable formations. A treatment fluid is prepared that comprises water and a plurality of water dispersible nanoparticles. The treatment fluid is then placed in the subterranean formation such that the water dispersible nanoparticles form one or more aggregates that plug formation pores and block further fluid flow from the one or more permeable formations into the wellbore.

In yet a further aspect, embodiments relate to methods for providing enhanced oil recovery. A treatment fluid is prepared that comprises water and a plurality of water dispersible nanoparticles. The treatment fluid is then placed in an injection well having a wellbore and one or more formations whose permeabilities vary, such that the water dispersible nanoparticles form one or more aggregates that plug pores in higher permeability regions of the one or more permeable formations. Such plugging inhibits flow of a waterflooding fluid from the wellbore into the higher permeability regions of the one or more permeable formations. The waterflooding fluid is pumped into the injection well such that the waterflooding fluid flows toward one or more recovery wells, thereby displacing oil or gas or both in the one or more permeable formations. The oil or gas or both are then produced from the one or more recovery wells.

DETAILED DESCRIPTION

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

For each aspect, the water dispersible nanoparticles are capable of plugging formations that contain highly saline connate waters (between 7 and 300 ppt of dissolved solids). The water dispersible nanoparticles are also useful at temperatures up to about 232° C. (450° F.) Furthermore, the water dispersible nanoparticles are capable of forming intra- and inter-molecular hydrogen bonds.

For each aspect, the water dispersible nanoparticles may comprise nanocellulose, rod-like nanoparticles, nanotubes, or halloysite or combinations thereof.

Nanocelluloses

Cellulose fibers and their derivatives constitute one of the most abundant renewable polymer resources. A specific type of cellulose, referred to as nanocellulose, has recently found utility in several industries. Nanocellulose may refer to at least three different types of nanocellulose materials, which vary depending on the fabrication method and the source of the natural fibers. These three types of nanocellulose materials are: nanocrystalline cellulose (NCC), microfibrillated cellulose (MFC), and bacterial cellulose (BC), which are described below. Additional details regarding these materials are described in U.S. Pat. Nos. 4,341,807, 4,374,702, 4,378,381, 4,452,721, 4,452,722, 4,464,287, 4,483,743, 4,487,634 and 4,500,546, the disclosures of each of which are incorporated by reference herein in their entirety.

Nanocellulose materials have a repetitive unit of (3-1,4 linked D glucose units, as seen in the following chemical structure.

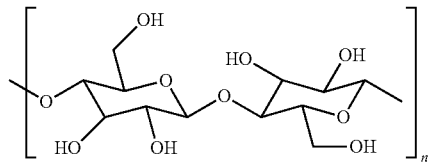

For each aspect, the water dispersible nanoparticles may comprise nanocellulose, rod-like nanoparticles, nanotubes, or halloysite or combinations thereof.

The integer values for the variable n relate to the length of the nanocellulose chains, which generally depends on the source of the cellulose and even the part of the plant containing the cellulosic material.

In some embodiments, n may be an integer from about 100 to about 10,000, from about 1,000 to about 10,000, or from about 1,000 to about 5,000. In other embodiments, n may be an integer from about 5 to about 100. In other embodiments, n may be an integer from about 5000 to about 10,000. In embodiments, the nanocellulose chains may have an average diameter between about 1 nm and about 1000 nm, or about 10 nm and about 500 nm, or 50 nm and about 100 nm.

NCC, also referred to as cellulose nanocrystals, cellulose whiskers, or cellulose rod-like nanocrystals, may be produced from cellulose fibers, as described in U.S. Patent Application Pub. No. 2013/0274149, which is incorporated by reference herein in its entirety. However, cellulose nanocrystals may have shapes other than rods. Examples include nanocrystals in the shape of a 4- to 8-sided polygon, such as a rectangle, hexagon or octagon. NCCs may be manufactured via the hydrolysis of cellulose fibers from various sources such as cotton, wood and wheat straw, and cellulose from algae and bacteria. These cellulose fibers are characterized in having two distinct regions—an amorphous region and a crystalline region. In embodiments, NCC can be prepared through acid hydrolysis of the amorphous regions of cellulose fibers that have a lower resistance to acid attack as compared to the crystalline regions of cellulose fibers. Consequently, NCC particles with "rod-like" shapes (herein after referred to as "rod-like nanocrystalline cellulose particles" or more simply "NCC particles") having a crystalline structure are produced. In embodiments, the hydrolysis process may be conducted under mild conditions such that the process does not result in any considerable degradation or decomposition rod-like crystalline portion of the cellulose.

In some embodiments, NCC may be prepared through acid hydrolysis of the amorphous and disordered paracrystalline regions of cellulose fibers that have a lower resistance to acid attack as compared to the crystalline regions of cellulose fibers. During the hydrolysis reaction, the amorphous and disordered paracrystalline regions of the cellulose fibers are hydrolyzed, resulting in the removal of microfibrils at the defects. This process also results in rod-like nanocrystalline cellulose particles or more simply "NCC particles" having a crystalline structure.

The NCC particles may be exceptionally tough, with a strong axial Young's modulus (150 GPa) and may have a morphology and crystallinity similar to the original cellulose fibers (except without the presence of the amorphous portion). In some embodiments, the degree of crystallinity can vary from about 50% to about 100%, such as from about 65% to about 85%, or about 70% to about 80% by weight. In some embodiments, the degree of crystallinity may be between about 85% and about 100%, or between about 88% and about 95% by weight.

In embodiments, the NCC particles may lengths between about 50 and about 500 nm, or between about 75 and about 300 nm, or between about 50 and about 100 nm. In embodiments, the diameter of the NCC particles may further have diameters between about 2 and about 500 nm, or between about 2 and about 100 nm, or between about 2 and about 10 nm. In embodiments, the NCC particles may have an aspect ratio (length/diameter) between about 10 and about 100, or about 25 and about 100, or about 50 and about 75.

Techniques that are commonly used to determine NCC particle size include scanning electron microscopy (SEM), transmission electron microscopy (TEM) and atomic force microsocopy (AFM). Wide-angle x-ray diffraction (WAXD) may be used to determine the degree of crystallinity.

In some embodiments, the NCCs or NCC particles may have a surface that is closely packed with hydroxyl groups, which allows for chemical modifications to be performed on their surfaces. In embodiments, some of the hydroxyl groups of the NCC or NCC particles may have been modified or converted prior to, during, and/or after introduction into the wellbore, such as to a sulfate ester group, during acid digestion. In some embodiments, some of the hydroxyl groups of the NCC or NCC particles surface may have been modified or converted to be carboxylated.

In embodiments, the method of preparing the NCCs or NCC particles (and thus the resultant functional groups present on the surface of the NCCs or NCC particles) may be chosen to tailor the specific properties of the fluids comprising the NCCs or NCC particles. For example, fluids comprising NCCs or NCC particles may display a thixotropic behavior or antithixotropic behavior, or no time-dependent viscosity. For instance, fluids incorporating hydrochloric acid-treated NCCs or NCC particles may possess thixotropic behavior at concentrations above 0.5% (w/v), and antithixotropic behavior at concentrations below 0.3% (w/v), whereas fluids incorporating sulfuric acid treated NCCs or NCC particles may show no time-dependent viscosity.

In embodiments, the NCC or NCC particles may be functionalized to form a functionalized NCC particle, such as a functionalized NCC particle in which the outer circumference of the nanocrystalline cellulose has been functionalized with various surface modifiers, functional groups, species and/or molecules. For example, such chemical functionalizations and/or modifications may be conducted to introduce stable negative or positive electrostatic charges on the surfaces of the NCCs or NCC particles. Introducing negative or positive electrostatic charges on the surface of NCCs or NCC particles may allow for better dispersion in the desired solvent or medium.

Modification, such as surface-only modification, of the NCC or NCC particles, may be performed by a variety of methods, including, for example, esterification, etherification, acetylation, silylation, oxidation, polymer grafting on the surface, functionalization with various chemical moieties (such as a hydrophobic group to improve compatibility with hydrocarbons and/or oil), and noncovalent surface modification, including the use of adsorbing surfactants and polymer coating, as desired. In embodiments, the surface functionalization process may be conducted under mild conditions such that the process does not result in any considerable degradation or decomposition of the rod-like nanocrystalline particles.

In embodiments, modification (such as surface-only modification) by grafting polymerization techniques may preserve the shape of the NCC or NCC particles. For example, the shape may be preserved by selecting a low molecular weight polymer such as a polymer with a molecular weight below about 100,000 Daltons.

In embodiments, chemical modifications may involve electrophiles that are site-specific when reacting with hydroxyl groups on NCC or NCC particle surfaces. For example, such electrophiles may be represented by a general formula such as, for example, RX, where "X" is a leaving group that may include a halogen, tosylate, mesylate, alkoxide, hydroxide or the like, and "R" may contain alkyl, silane, amine, ether, ester groups and the like. In embodiments, surface functionalization with such electrophiles may be performed in a manner that does not decrease the size or the strength of the NCC or NCC particle.

In some embodiments, the NCC or NCC particle surfaces may have a surface functionalization between about 5 and about 90 percent, or about 25 and about 75 percent, or about 40 and about 60 percent. In some embodiments, between about 5 and about 90 percent of the hydroxyl groups on NCC or NCC particle surfaces may be chemically modified, or about 25 and about 75 percent, or about 40 and about 60 percent.

Fourier Transform Infrared (FT-IR), Raman spectroscopies or other known methods may be employed to assess the percent surface functionalization, for example via investigation of vibrational modes and functional groups present on the NCC or NCC particles. Additionally, analysis of the local chemical composition of the cellulose, NCC or NCC particles may be carried out using energy-dispersive X-ray spectroscopy (EDS). The bulk chemical composition may be determined by elemental analysis (EA). Zeta potential measurements may be used to determine the surface charge and density. Thermogravimetric analysis (TGA) and differential scanning calorimetry (DSC) may be employed to understand changes in heat capacity and thermal stability.

Micro Fibrillated Cellulose (MFC), or nanofibrils or nanofibrillated cellulose (NFC) or crystal nano fibril (CNF), is a form of nanocellulose derived from wood products, sugar beets, agricultural raw materials or waste products. In MFC, the individual microfibrils have been incompletely or totally detached from each other. For example, the microfibrillated cellulose material has an average diameter between about 5 nm and about 500 nm, or about 5 nm and about 250 nm, or about 10 nm and about 100 nm. In some embodiments, the microfibrillated cellulose material may have an average diameter between about 10 nm and about 60 nm. Furthermore, in MFC, the length may be up to 1 µm, or between about 500 nm and about 1 µm, or between about 750 nm and about 1 µm. The ratio of length (L) to diameter (d) of the MFC may be between about 50 and about 150, or about 75 and about 150, or about 100 and about 150.

One method to produce MFC is via the delamination of wood pulp by mechanical pressure before and/or after chemical or enzymatic treatment. Additional methods include grinding, homogenizing, intensification, hydrolysis/electrospinning and exposure to ionic liquids. Mechanical treatment of cellulosic fibers is very energy consuming and this has been a major impediment for commercial success. Additional examples for manufacturing MFC are described in WO 2007/091942, WO 2011/051882, U.S. Pat. No. 7,381,294 and U.S. Patent Application Pub. No. 2011/0036522, each of which is incorporated by reference herein in its entirety.

MFC may be similar in diameter to the NCC particle, but MFC is more flexible because NCC particles have a very high crystalline content (which limits flexibility). For example, in contrast to the high crystalline content of NCC particles, which may be homogeneously distributed or constant throughout the entire NCC particle, MFCs contain distinct amorphous regions, such as amorphous regions that alternate with crystalline regions, or amorphous regions in which crystalline regions are interspersed. Additionally, MFCs possess little order on the nanometer scale, whereas NCC and/or NCC particles are highly ordered. Furthermore, the crystallinity of MFCs may approach 50%, whereas the crystallinity of NCCs is higher and will depend on the method of production.

Bacterial nanocellulose (BC) is a material obtained via a bacterial synthesis from low molecular weight sugar and alcohol for instance. The diameter of this nanocellulose is found to be generally between about 20 and 100 nm. Characteristics of cellulose producing bacteria and agitated culture conditions are described in U.S. Pat. No. 4,863,565, the disclosure of which is incorporated by reference herein in its entirety. BC particles are microfibrils secreted by various bacteria that have been separated from the bacterial bodies and growth medium. The resulting microfibrils are microns in length, and have a large aspect ratio (greater than 50) with a morphology depending on the specific bacteria and culturing conditions.

The nanocellulose may be present in the treatment fluid in an amount between about 0.1 wt % and about 5 wt %, or 0.1 wt % and about 3 wt %, or between about 0.5 wt % and about 2 wt %.

Rod-Like Nanoparticles

As used herein, the term "nanoparticle" or "nanoparticulate" means a particle having at least one dimension that is less than about 1 µm. An example of a nanoparticle is a generally spherical particle with a diameter less than 1 µm. Another example of a nanoparticle is a rod-like elongated structure having a diameter between 1 and 10 nm, but a length longer than 1 µm because at least one dimension is smaller than 1 µm.

The water dispersible nanoparticles may be elongated rod-like structures. In one example, the average length of the rod is longer than 1 µm, but the average diameter is on the order of about 200 nm. In another example, the elongated rod-like structure has a submicron length and an average diameter less than about 100 nm. In yet another example, the elongated rod-like structure has an average length of about 700 nm, and an average diameter of about 85 nm.

In embodiments, the metal nanoparticles are composed of (i) one or more metals or (ii) one or more metal composites. Suitable metals may include, for example, Al, Ag, Au, Pt, Pd, Cu, Co, Cr, In, and Ni, particularly the transition metals, for example, Ag, Au, Pt, Pd, Cu, Cr, Ni, and mixtures thereof. Silver may be used as a suitable metal. Suitable metal composites may include Au—Ag, Ag—Cu, Ag—Ni, Au—Cu, Au—Ni, Au—Ag—Cu, and Au—Ag—Pd. The metal composites may also include non-metals, such as, for example, Si, C, and Ge. The various components of the metal composite may be present in an amount ranging for example between about 0.01% and about 99.9% by weight, or between 10% and about 90% by weight.

Halloysite

As discussed earlier, the water dispersible nanoparticle may be comprised of halloysite, such as a halloysite nanotube. Halloysite ($Al_2Si_2O_5(OH)_4$) is an clay material that can be mined from deposits as a raw mineral. Halloysite is an aluminosilicate that is chemically similar to kaolin that exhibits a range of morphologies.

One predominant form of halloysite is a hollow tubular structure in the sub-micrometer range. The sizes of known halloysite tubules can vary depending on the deposit. Known sizes include tubules that are, for example, between about 500 nm and about 1000 nm in length and between about 15 nm to about 100 nm in inner diameter, although dimensions outside these ranges may be possible. The neighboring alumina and silica layers, and their waters of hydration, create a packing disorder causing the halloysite tubules to curve and roll up, forming multilayer tubes. The nanotubes exhibit a naturally exfoliated morphology. Thus, chemical means are not necessary to disperse the material.

Any suitable halloysite nanotubes may be employed in the compositions of the present disclosure. Examples include halloysite nanotubes having an average aspect ratio of at least about 5, such as aspect ratios ranging from between about 10 and about 100, or between about 20 and about 50. Example nanotubes have diameters smaller than about 200 nm, such as diameters between about 10 nm and about 100 nm, or about 15 nm and about 75 nm.

For each aspect, the nanocellulose may comprise nanocrystalline cellulose, microfibrillated cellulose or bacterial cellulose or combinations thereof.

For each aspect, the rod-like nanoparticles may comprise one or more metals, or one or more metal composites, or combinations thereof.

For each aspect, the water dispersible nanoparticles may have lengths between about 50 nm and 50 µm, and diameters between about 2 nm and 500 nm.

For each aspect, the water dispersible nanoparticles may be present in the treatment fluid at a concentration between about 0.1 wt % and 5.0 wt %.

For each aspect, the one or more permeable formations have fracturing pressures, and the treatment fluid is placed at a pressure that is lower than the fracturing pressures.

For each aspect, skilled persons will understand that, depending on a particular well, the terms "higher permeability" and "lower permeability" are relative ones and can span a wide range. For the claimed treatments it will be understood by skilled persons that the treatment fluids will follow the path of least resistance and migrate to regions where the formation permeability is higher.

For each aspect, skilled persons will understand that the activity of the treatment fluids may be confined to what is commonly referred to as the "near wellbore" region. Such an assumption is based on the limitation that the treatment fluid is placed at a pressure that is lower than the fracturing pressures. Skilled persons will understand that the near wellbore region occupies a space that extends radially about 10 m (33 ft) from the wellbore.

For each aspect, skilled persons will understand that the treatment fluids may be placed in the subterranean well by similar techniques as those known in the art for water control purposes. The treatment fluids may be bullheaded into the well, or more precisely placed by insertion of a tubular string such as coiled tubing. Further, packers may be installed in the wellbore that isolate the permeable zones to be treated. A tubular string such as coiled tubing may be inserted between the packers, and the treatment fluid may be more accurately placed into the permeable zones of interest. Complete information concerning these placement techniques may be found in the following publication. Hardy M and Lockhart T: "Water Control" in Economides M J, Watters L T and Dunn-Norman S: *Petroleum Well Construction*, John Wiley & Sons, Chichester (1998) 571-591.

For each aspect, the treatment fluid may be foamed with air or nitrogen to provide additional selectivity with regard to the permeable intervals the treatment fluid may enter.

The foregoing is further illustrated by reference to the following examples, which are presented for purposes of illustration and are not intended to limit the scope of the present disclosure.

EXAMPLES

In the following examples, laboratory experiments were conducted during which treatment fluids comprising a plurality of nanocrystalline particles were pumped into sandstone cores. The sandstone cores (4.72 cm long and 2.54 cm in diameter, or 12 in. long and 1 in. in diameter) were placed into Hassler sleeves. An initial permeability measurement was performed by pumping a 2 wt % KCl solution through the cores at 5 mL/min and recording the pressure differential. Darcy's Law was employed to calculate the initial permeability in mD. A volume of the treatment fluid was then pumped through the core. Then, 2% KCl was pumped through the core and the pressure differential was recorded under the same initial conditions. The difference between the pre-treatment and post-treatment permeabilities indicated the ability of the treatment fluid to inhibit water flow.

Example 1

Nanocrystalline cellulose (NCC), with a length of about 100 nm and diameter of about 6 nm, was dispersed at about 1 wt % in a brine solution ($CaCl_2/CaBr_2$). The brine density was 1460 kg/m$^3$ (12.2 lbm/gal). To measure the extent of formation plugging, the measurement of the core permeability before and after injection treatment fluid (3 pore volumes) was performed. The testing was performed at 121° C. (250° F.). The initial and final core permeabilites were measured against a 2 wt % KCl solution. The initial permeability of the core (Bentheimer sandstone) was 744 mD. After injection of the treatment fluid and shut-in time of 1 hr, the permeability of the core fell to 11 mD.

Example 2

A lower permeability Berea sandstone core of the same dimensions described in Example 1 was selected. The initial permeability was 65 mD. Five pore volumes of a 1,270-kg/m$^3$ (10.6 lbm/gal) calcium chloride solution containing 1.5% NCC were injected into the core at 110° C. (230° F.). The final core permeability was 8 mD, indicating that the particles were able to penetrate the small pores and inhibit further fluid flow.

Example 3

A 220-mD Aloxite™ synthetic aluminum oxide core with 43% porosity was saturated with an aqueous 2-wt % KCl solution. The test was conducted at 129° C. (265° F.). Next, a polyacrylamide gel was injected in a first direction at a rate of 2 mL/min. Injection continued until a constant differential pressure—1.52 MPa (220 psi)—was attained. Then, the polyacrylamide gel containing 1 wt % NCC was injected into the core in a second (opposite) direction at a rate of 1 mL/min until the differential reached the maximum differential detectable by the apparatus—12.4 MPa (1,800 psi). Next, the polyacrylamide gel without NCC was injected back in the first direction. The differential pressure stabilized at 5.30 MPa (770 psi)—3.80 MPa (550 psi) higher than the initial measurement—showing that blockage had occurred in the core.

Although a few example embodiments have been described in detail above, those skilled in the art will readily appreciate that many modifications are possible in the example embodiments without materially departing from this disclosure. Accordingly, each such modification is intended to be included within the scope of this disclosure as defined in the following claims.

The invention claimed is:

1. A method for treating a subterranean well having one or more permeable formations, comprising:
    preparing a treatment fluid that comprises nanoparticles suspended in a polyacrylamide gel;
    placing the treatment fluid in the subterranean formation such that the nanoparticles form one or more aggregates that plug formation pores and block further fluid flow in the formation.

2. The method of claim 1, wherein the nanoparticles comprise nanocellulose, rod-like nanoparticles, nanotubes, or halloysite or combinations thereof.

3. The method of claim 2, wherein the nanocellulose comprises nanocrystalline cellulose, microfibrillated cellulose or bacterial cellulose or combinations thereof.

4. The method of claim 2, wherein the rod-like nanoparticles comprise one or more metals, or one or more metal composites, or combinations thereof.

5. The method of claim 1, wherein the nanoparticles have lengths between about 50 nm and 500 μm, and diameters between about 2 nm and 500 nm.

6. The method of claim 1, wherein the nanoparticles are present in the treatment fluid at a concentration between about 0.1 wt % and 5.0 wt %.

7. The method of claim 1, wherein the one or more permeable formations have fracturing pressures, and the treatment fluid is placed at a pressure that is lower than the fracturing pressures.

8. A method for controlling water production from a subterranean well having a wellbore and one or more permeable formations, comprising:
    preparing a treatment fluid that comprises nanoparticles suspended in a polyacrylamide gel;
    placing the treatment fluid in the one or more permeable formations such that the nanoparticles form one or more aggregates that plug formation pores and block water flow from the one or more permeable formations into the wellbore.

9. The method of claim 8, wherein the nanoparticles comprise nanocellulose, rod-like nanoparticles, nanotubes, or halloysite or combinations thereof.

10. The method of claim 9, wherein the nanocellulose comprises nanocrystalline cellulose, microfibrillated cellulose or bacterial cellulose or combinations thereof.

11. The method of claim 9, wherein the rod-like nanoparticles comprise one or more metals, or one or more metal composites, or combinations thereof.

12. The method of claim 8, wherein the nanoparticles have lengths between about 50 nm and 500 µm, and diameters between about 2 nm and 500 nm.

13. The method of claim 8, wherein the nanoparticles are present in the treatment fluid at a concentration between about 0.1 wt % and 5.0 wt %.

14. The method of claim 8, wherein the one or more permeable formations have fracturing pressures, and the treatment fluid is placed at a pressure that is lower than the fracturing pressures.

15. A method for providing enhanced oil recovery, comprising:
(i) preparing a treatment fluid that comprises nanoparticles suspended in a polyacrylamide gel;
(ii) placing the treatment fluid in an injection well having a wellbore and one or more formations whose permeabilities vary, such that the nanoparticles form one or more aggregates that plug pores in higher permeability regions of the one or more permeable formations, thereby inhibiting flow of a waterflooding fluid from the wellbore into the higher permeability regions of the one or more permeable formations;
(iii) pumping the waterflooding fluid into the injection well such that the waterflooding fluid flows toward one or more recovery wells, thereby displacing oil or gas or both in the one or more permeable formations; and
(iv) producing the oil or gas or both from the one or more recovery wells.

16. The method of claim 15, wherein the nanoparticles comprise nanocellulose, rod-like nanoparticles, nanotubes, or halloysite or combinations thereof.

17. The method of claim 16, wherein the nanocellulose comprises nanocrystalline cellulose, microfibrillated cellulose or bacterial cellulose or combinations thereof.

18. The method of claim 16, wherein the rod-like nanoparticles comprise one or more metals, or one or more metal composites, or combinations thereof.

19. The method of claim 15, wherein the nanoparticles have lengths between about 50 nm and 500 µm, and diameters between about 2 nm and 500 nm.

20. The method of claim 15, wherein the one or more permeable formations have fracturing pressures, and the treatment fluid is placed at a pressure that is lower than the fracturing pressures.

* * * * *